Dec. 18, 1951     C. B. DALE     2,579,175
PHONOGRAPH
Original Filed Dec. 15, 1949     10 Sheets-Sheet 1

INVENTOR.
Colin B. Dale

Dec. 18, 1951  C. B. DALE  2,579,175
PHONOGRAPH
Original Filed Dec. 15, 1949  10 Sheets-Sheet 2
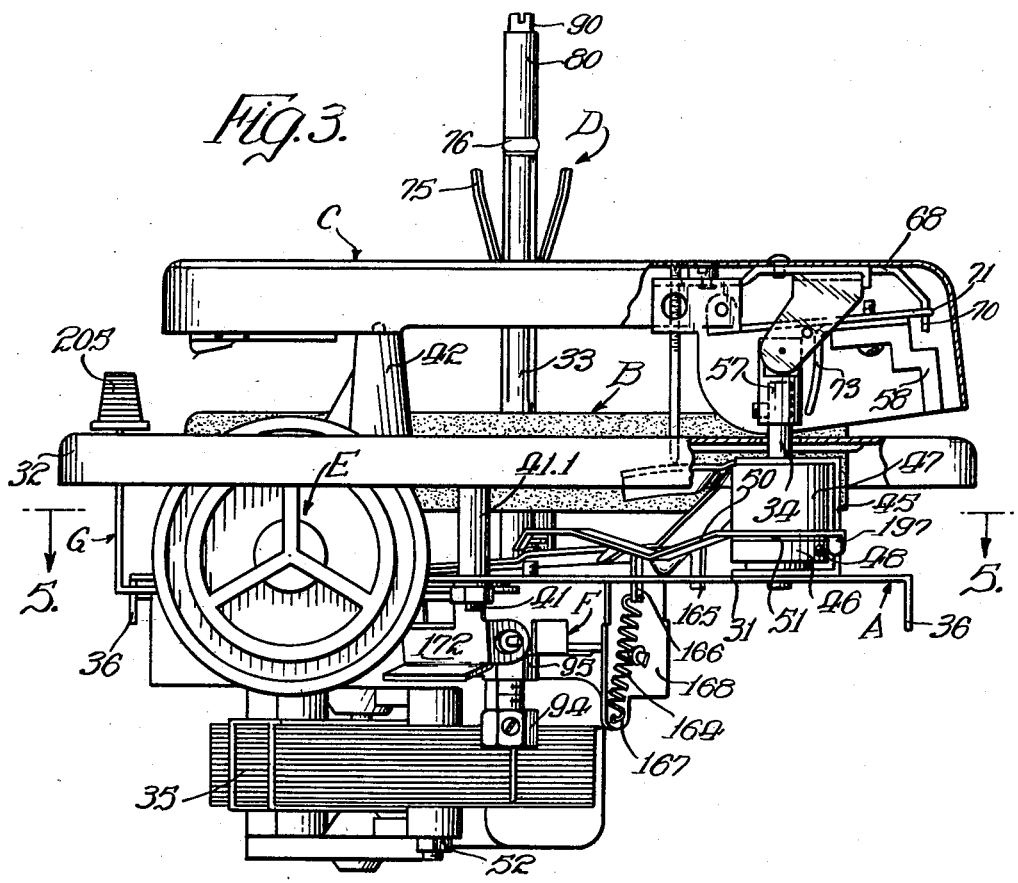
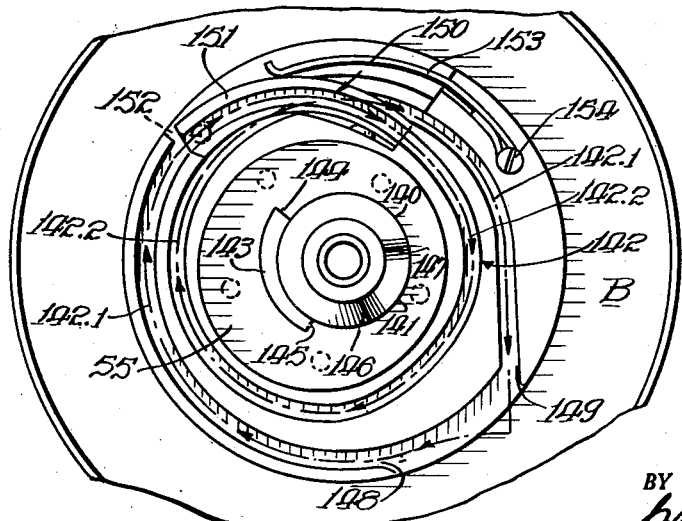
INVENTOR.
Colin B. Dale
BY
*Henning & Henning*
Attys.

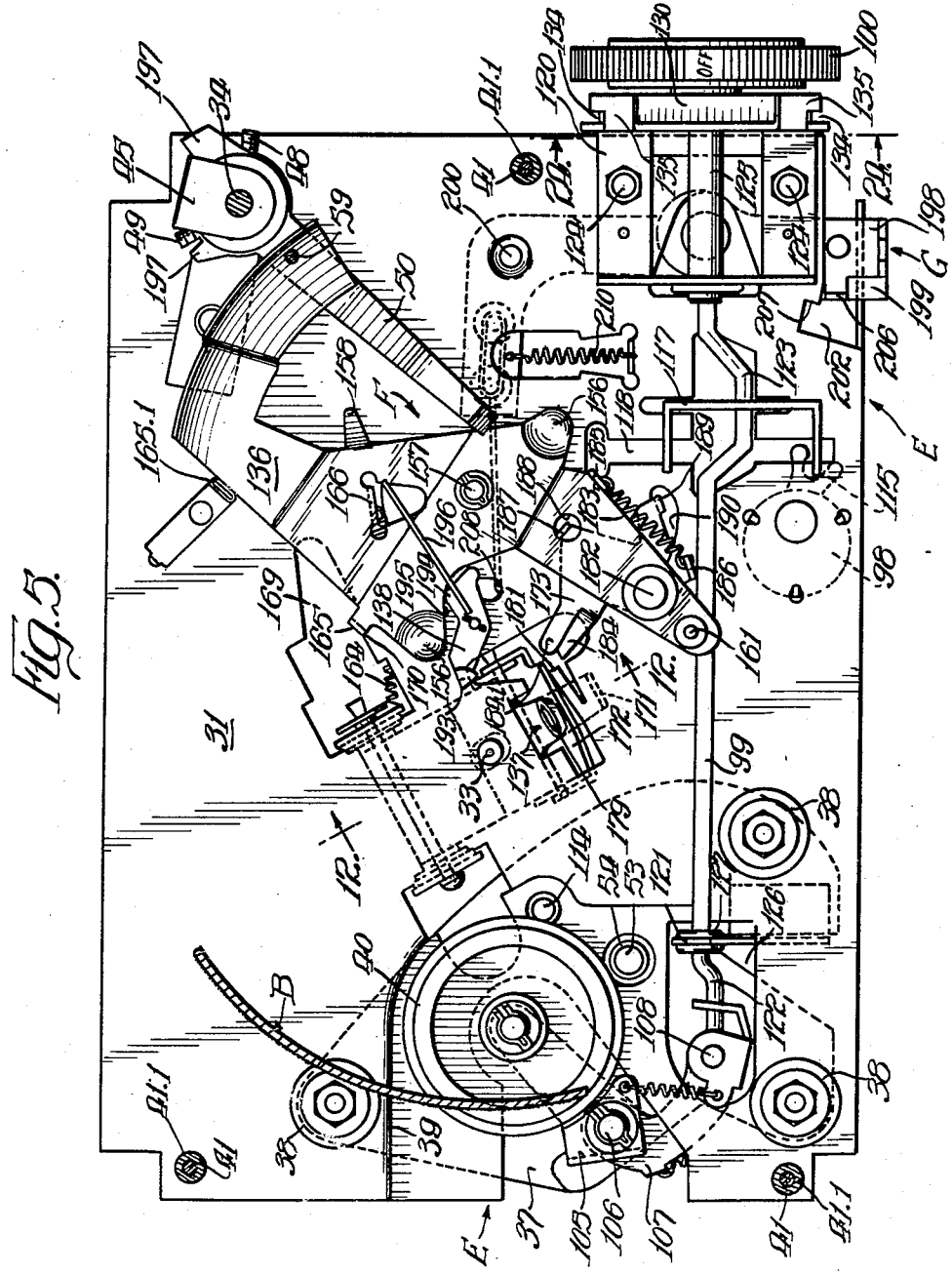

Dec. 18, 1951 C. B. DALE 2,579,175
PHONOGRAPH
Original Filed Dec. 15, 1949 10 Sheets-Sheet 4

INVENTOR.
Colin B. Dale
BY
Bunning & Bunning
Attys.

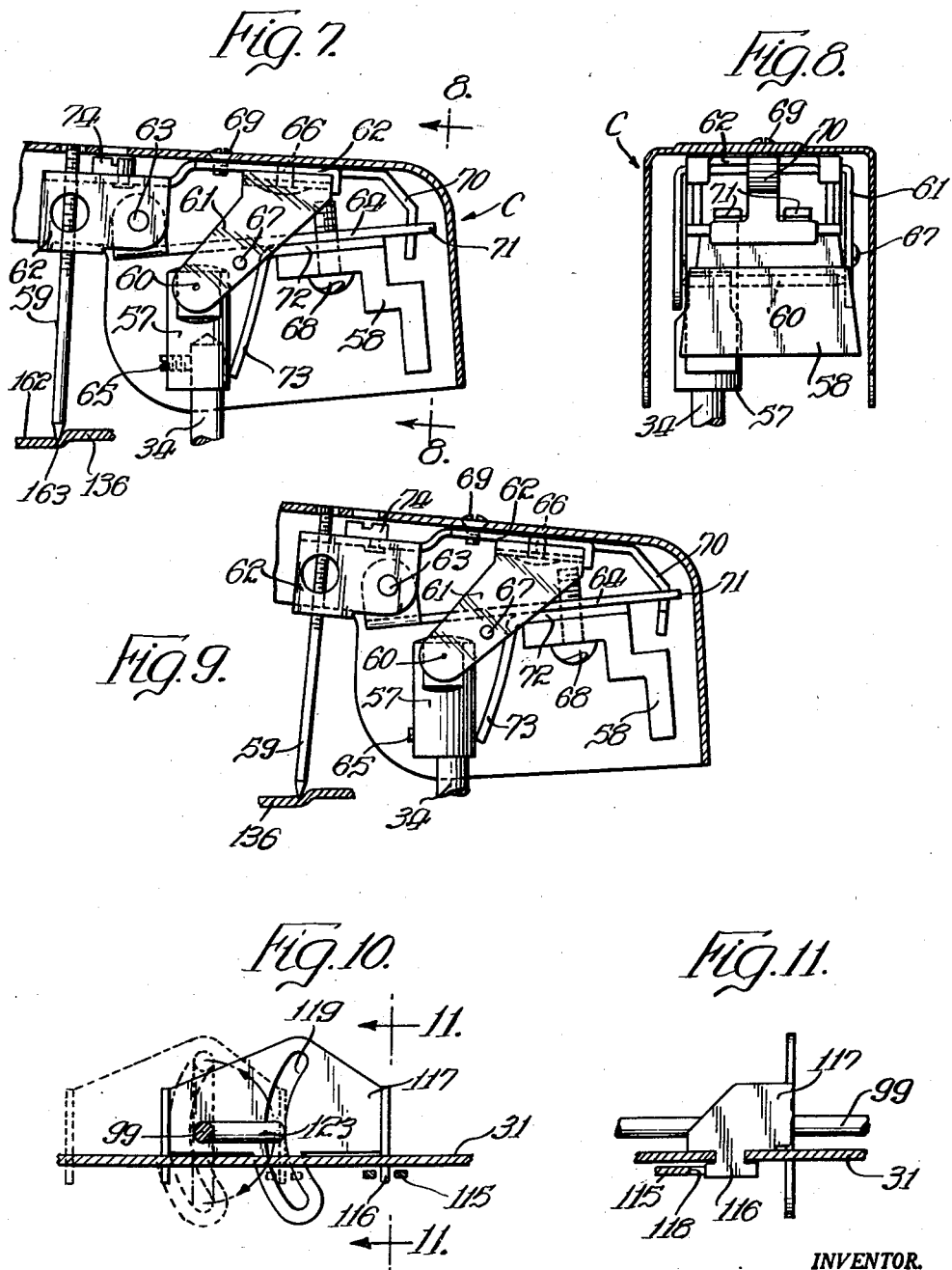

Dec. 18, 1951 C. B. DALE 2,579,175
PHONOGRAPH
Original Filed Dec. 15, 1949 10 Sheets-Sheet 6
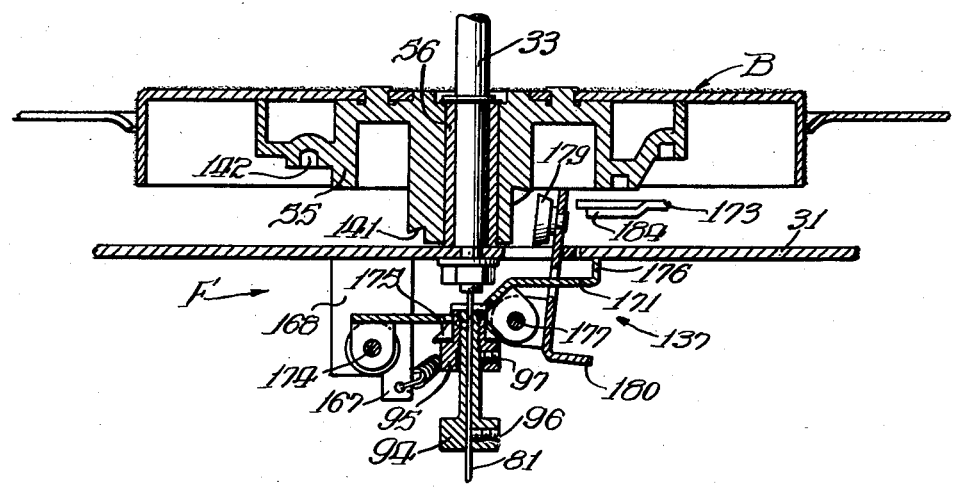
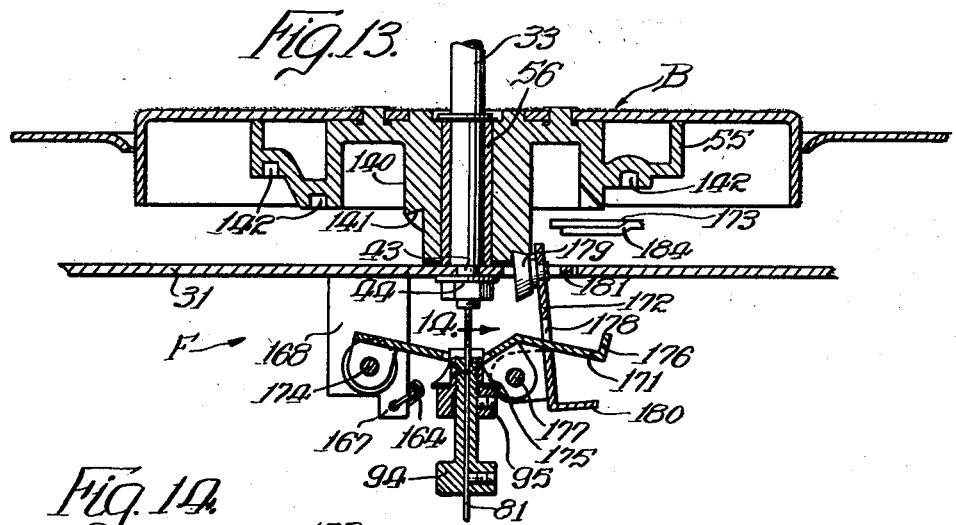
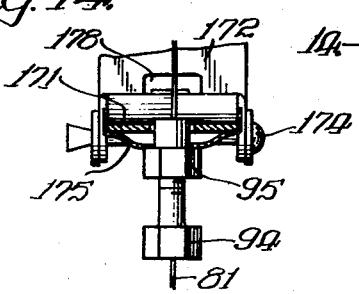
INVENTOR.
Colin B. Dale Dec. 18, 1951  C. B. DALE  2,579,175
PHONOGRAPH
Original Filed Dec. 15, 1949  10 Sheets-Sheet 7
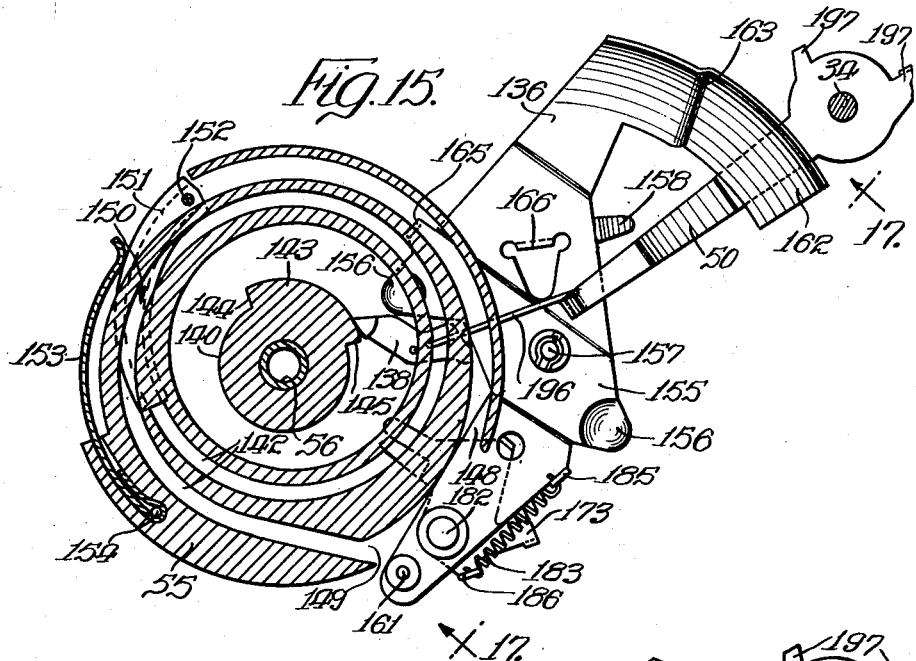
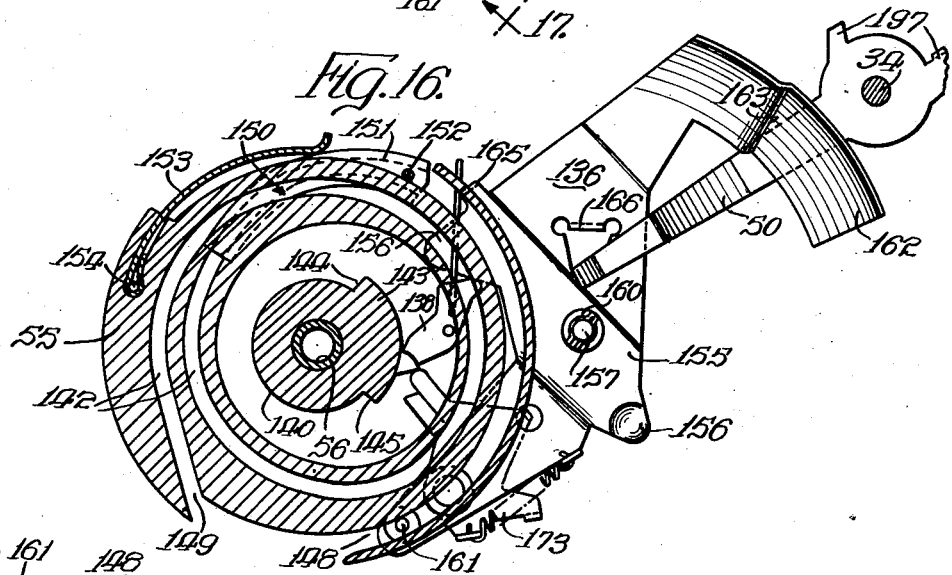
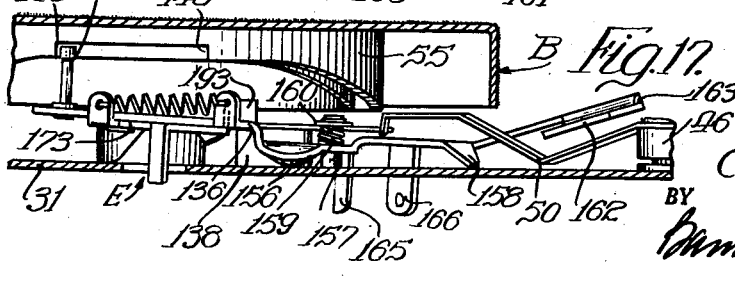
INVENTOR.
Colin B. Dale
BY
Benning & Benning
Attys.

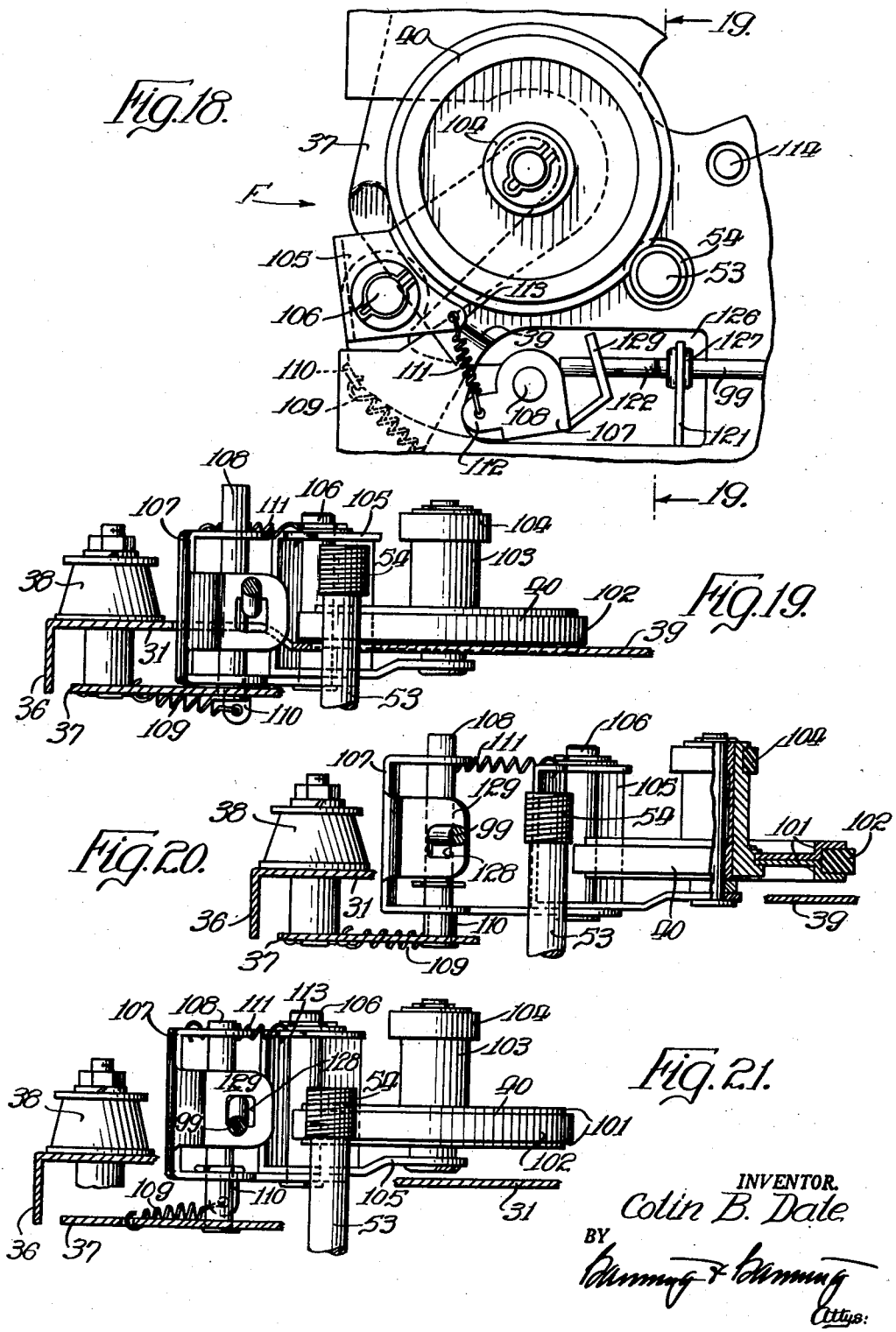

Dec. 18, 1951  C. B. DALE  2,579,175
PHONOGRAPH
Original Filed Dec. 15, 1949  10 Sheets-Sheet 9

INVENTOR.
Colin B. Dale
BY
Channing & Channing
Attys.

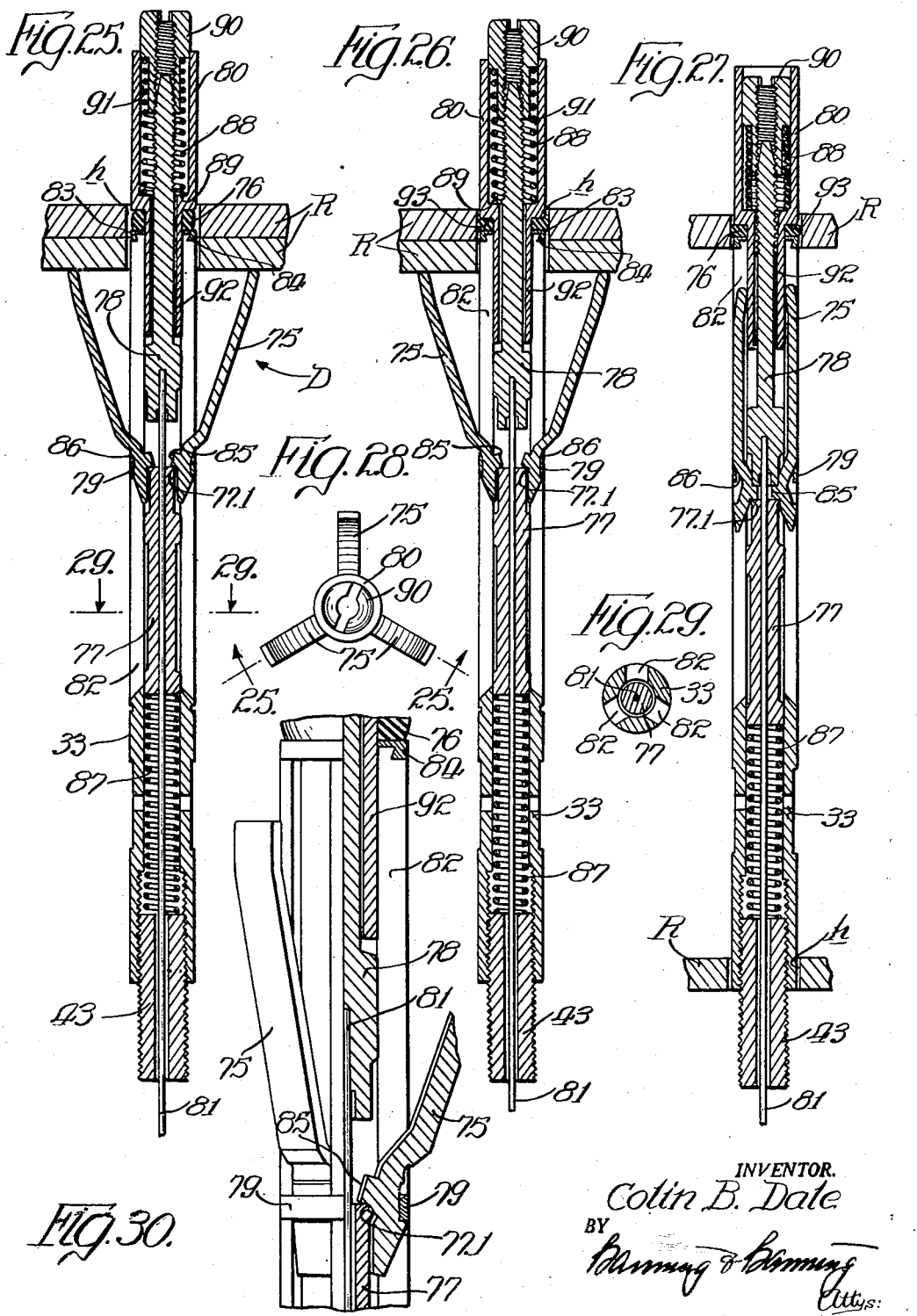
Dec. 18, 1951     C. B. DALE     2,579,175
PHONOGRAPH
Original Filed Dec. 15, 1949     10 Sheets-Sheet 10
INVENTOR.
Colin B. Dale Patented Dec. 18, 1951

2,579,175

UNITED STATES PATENT OFFICE 2,579,175

PHONOGRAPH

Colin B. Dale, Oak Park, Ill., assignor to Webster-Chicago Corporation, Chicago, Ill., a corporation of Illinois Original application December 15, 1949, Serial No. 133,168. Divided and this application January 13, 1950, Serial No. 138,472

4 Claims. (Cl. 274—10)

The main objects of this invention are to provide an improved construction and arrangement of the several parts of and operating mechanisms for a phonograph; to provide for the tone arm of the phonograph an improved form and mounting of a counterweight which is rendered automatically effective, when the tone arm is in playing position, to assure as light a bearing as possible of the needle on the record, but which is rendered automatically ineffective to counterbalance the weight of the tone arm when it is being retracted to starting position; to provide an improved mechanism for changing the speed of the record-supporting turntable so as to permit the playing of records which require different operational speeds; to provide improved means for synchronizing the switching on and off of the current to the motor with the actuation of the speed-changing mechanism from a neutral or "off" position to either of two speed positions; to provide improved means for supporting a stack of records and successively releasing them one at a time for positioning on the turntable; to provide an improved form and operation of mechanism for automatically returning the tone arm to starting position and resetting it, and simultaneously effecting the actuation of the record-release means to permit a continuous playing of a plurality of records; to provide an improved construction and arrangement of cam means for effecting the operation of the same tone arm return and record-release actuating mechanism; to provide improved, manually operable, means for initiating operation of the record-release actuating means so as to begin the playing of the first of a plurality of records, or to position a record on one already deposited on the turntable; and to provide an improved form of record-changing and speed-altering phonograph in which the various parts of each mechanism are so combined, and the several mechanisms are so coordinated, as to make it very economical to manufacture, simple and positive in control and operation, and highly efficient in tone reproduction.

In the accompanying drawings:

Fig. 3 is an elevational view thereof, a part of the tone arm being broken away so as to more clearly illustrate the arrangement of the counterbalancing weight therefor;

Fig. 4 is an enlarged under side view of the turntable, showing the three tracks of the cam for the tone arm retracting and record-release actuating mechanism, and by arrows diagramming the path of the cam track follower which effects a lifting of the tone arm and its return to, and resetting at, starting position;

Fig. 5 is an enlarged plan view of the several operating mechanisms in their normally inoperative positions, as viewed from the plane of line 5—5 of Fig. 3, immediately prior to the placing of the tone arm in position for reproducing a record;

Figure 6:
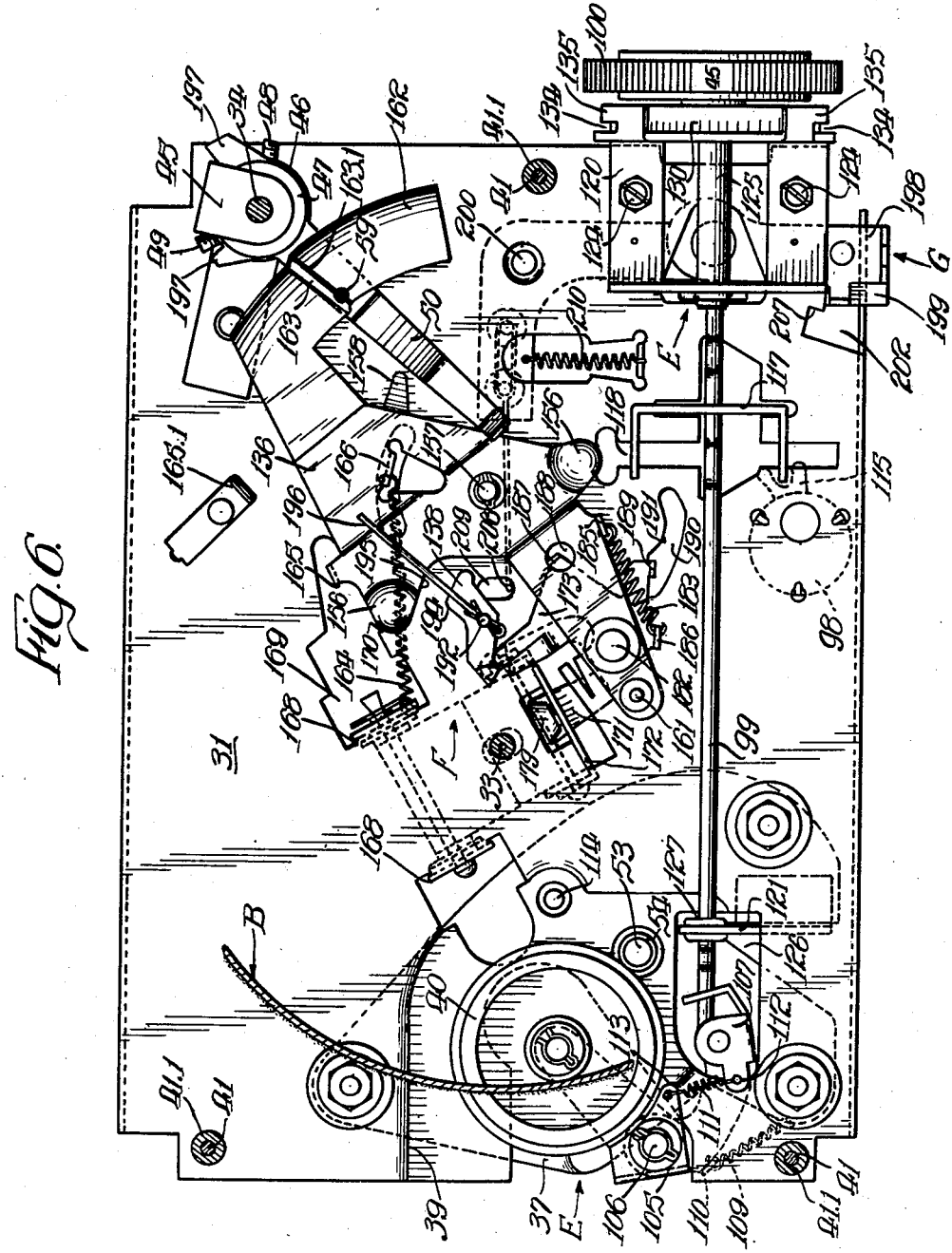

Fig. 6 which is a view similar to Fig. 5 shows the parts in the positions to which they have shifted incidentally to returning the tone arm to its starting position preparatory to playing a concurrently-released record;

Fig. 7 is an enlarged, cross-sectional view of the rear end of the tone arm showing the relative positions of the counterweight and the related parts at the instant the counterweight becomes effective or ineffective in counterbalancing the weight of the tone arm;

Fig. 8 is a transverse, sectional detail, taken on line 8—8 of Fig. 7;

Fig. 9 which is a view similar to Fig. 7 shows the relative positions of the counterweight and the related parts when the outer end of the tone arm has been elevated and the counterweight has become ineffective as a counterbalance to the tone arm;

Fig. 10 is a fragmentary detail showing in full and dotted outlines the opposite positions of the switch-shifting slide associated with the speed-changing mechanisms;

Fig. 11 is a transverse view of the same, taken on line 11—11 of Fig. 10;

Fig. 12 which is an enlarged, cross-sectional, elevational view of the record-releasing mechanism, shows the parts immediately prior to their being shifted to release a record, the view being taken in the plane of line 12—12 of Fig. 5;

Fig. 13 is a similar view showing the above mechanism in its record-releasing position;

Fig. 14 is a detail view, taken on line 14—14 of Fig. 13;

Fig. 15 is a cross-sectional plan view of the turntable cam for the tone arm retracting and record-release actuating plate, as viewed from a plane below the top of said turntable, showing the form of the tracks of the cam and the relative position of the plate immediately prior to shifting thereof to initiate its engagement with the cam track which subsequently effects elevation of the tone arm as it completes playing of the record and causes its return to starting position;

Fig. 16 which is a similar view shows the relative positions of the cam and plate as they begin their engagement to effect return of the tone arm and actuation of the record-releasing mechanism.

Figure 22:
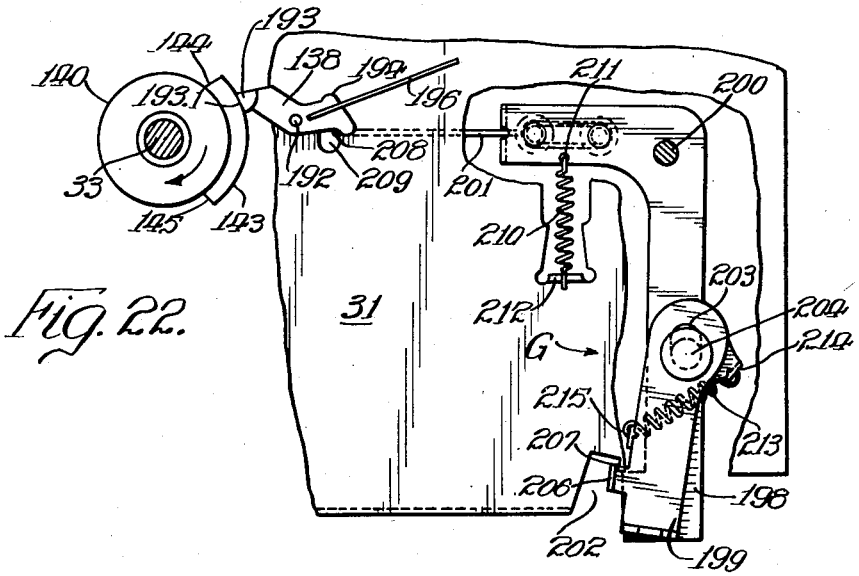
Figure 23:
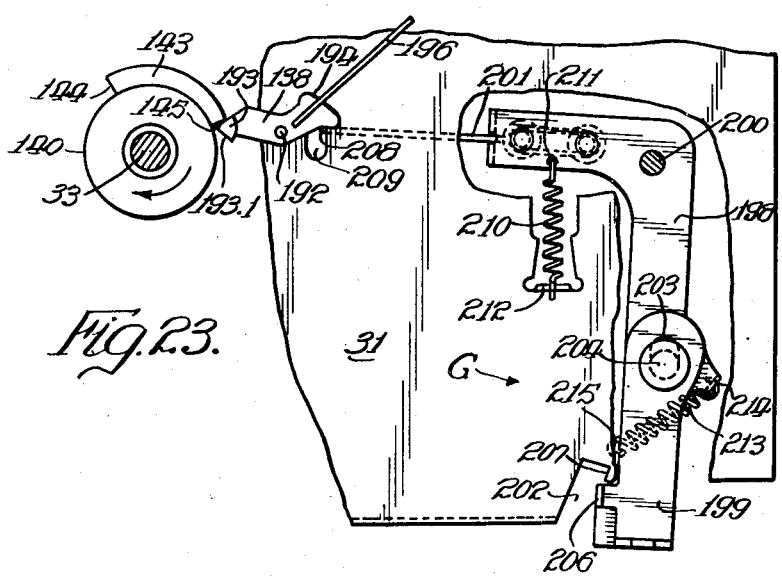
Figure 24:
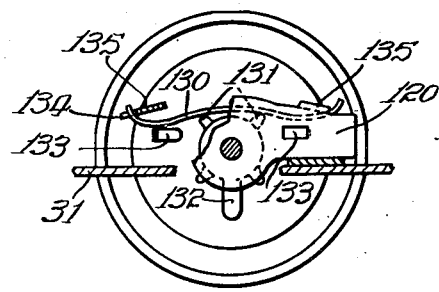

Fig. 17 is a side elevation of the aforesaid cam and plate, taken on line 17—17 of Fig. 15, showing the record turntable in section;

Fig. 18 is an enlarged, fragmentary plan view of the turntable driving pulley in operating contact with one of the driving hubs on the motor drive shaft;

Fig. 19 is an elevational view of the same, taken on line 19—19 of Fig. 18;

Fig. 20 which is a view similar to Fig. 19 shows the relative position of the parts when the turntable driving pulley has been shifted to its neutral or inoperative position;

Fig. 21 is a view similar to Fig. 19, showing the relative position of the parts when the turntable driving pulley is in contact with the other driving hub of the motor drive shaft;

Fig. 22 is a fragmentary plan view of the manually operable mechanism whereby to release a record so as to reject or avoid the playing of a previously released record, the parts being shown in their temporarily locked positions resulting from the shifting of this reject mechanism when the trigger for the tone arm retracting lever has been immobilized;

Fig. 23 is a similar view showing the reject lock mechanism released after the turntable has moved to restore the aforesaid trigger to its operative condition;

Fig. 24 is an elevational detail showing the means for releasably holding the speed-changing operating dial in any one of its alternative positions;

Figs. 25, 26, and 27 are enlarged vertical, sectional details showing the record support and release means, respectively, in its normal position for supporting the records, and in its partially and in its completely shifted positions incident to releasing a record and retaining in position the record or records above the one released;

Fig. 28 is a plan view of the record-supporting spindle prior to the placement of any records thereon;

Fig. 29 is a transverse sectional view in detail, taken on line 29—29 of Fig. 25; and Fig. 30 is a fragmentary detail of the spindle and associated parts in the region of the record support and release means, the view being a longitudinal section to the right of the center line and in elevation to the left thereof.

A phonograph constructed in accordance with this invention comprises a support A mounting a motor-driven record-supporting turntable B, a reciprocating tone-reproducing arm C, and a record support and release means D wherewith is associated a speed-changing and switch-actuating mechanism E, a tone arm retracting and record-release actuating mechanism F, and a manually operable record-release actuating means G which also serves as a starting means for the phonograph.

*Support for the operating mechanism*

The support A comprises a base 31 in the form of a plate upon which is arranged all of the mechanism for the present phonograph, including a platform 32, a record spindle 33, a tone arm post 34, and a motor 35.

The base 31 herein shown as rectangular is provided with reinforcing flanges 36 along its lateral edges, and with certain struck-out lugs, fingers, shoulders, and openings, as will be noted hereinafter in the descriptions of the several mechanisms. At one corner the base 31 suspends a plate 37 whereto is attached the motor 35. This suspension involves the use of rubber cushions 38 (see Figs. 5, 6, 19 and 20) in order to reduce to a minimum the transmission of motor vibrations to the record-supporting turntable B. Adjacent this suspension of the motor plate 37, the base plate is depressed, as shown at 39 (Figs. 5, 6 and 18), and recessed in order to better provide for mounting of the turntable drive pulley 40 which forms a part of the speed-change and switch-control mechanism E, as will be described more fully hereinafter.

The platform 32 is in the form of a plate supported in spaced relationship to the base 31 by bolts and nuts 41 and bushings 41.1 (see Figs. 3, 5 and 6). The platform 32 mounts a tone arm rest 42.

The spindle 33 is supported on the base 31 near its middle by a nipple 43 (see Figs. 25, 26, and 27) on to which it is threaded and which in turn is secured to the base by a nut 44 (see Figs. 12 and 13).

The post 34 which mounts the tone arm C is rotatably mounted on a U-shaped bracket 45 secured adjacent one corner of the base 31, and has associated therewith a collar 46 and a bushing 47. The collar 46 is keyed to the post 34 and has headless screws 48 and 49 (see Figs. 5 and 6) which abut the opposite edges of the vertical part of the bracket 45 to limit swinging movement of the tone arm C.

The bushing 47 holds a feeler arm 50 (forming a part of the tone arm return and record-release actuating mechanism F which is to be described more fully hereinafter) in contact with a friction pad 51 resting on the collar 46, the purpose of which will be explained at a later point.

Figure 2:
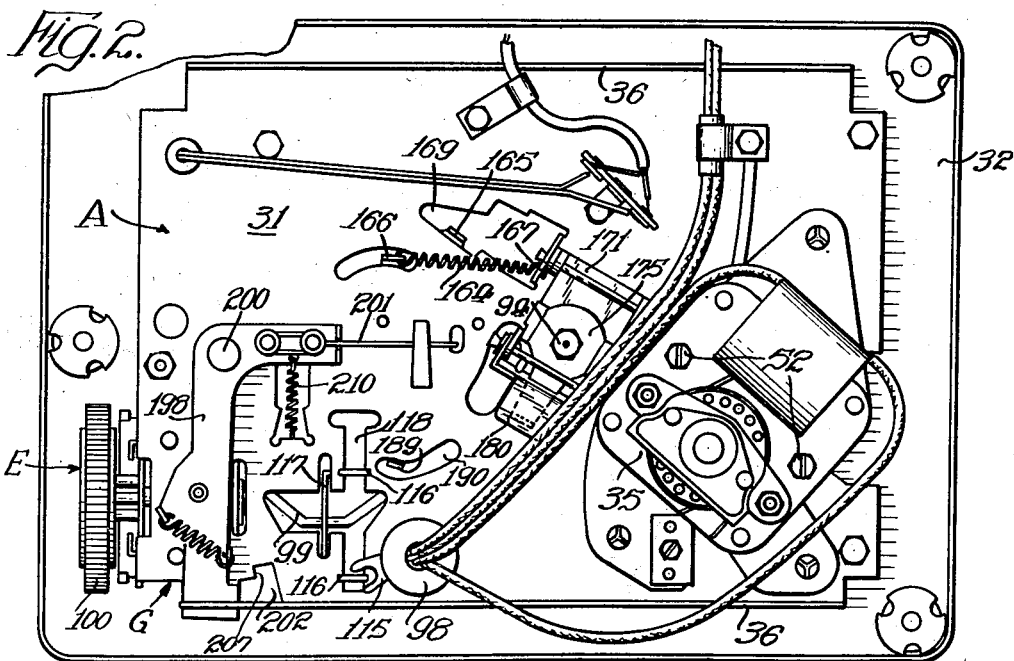
Fig. 2 is a bottom or under side view of the same, the view being reversed 180 degrees from that of Fig. 1.

The motor 35 may be of any type suitable for this purpose. As herein shown, it is attached to the under side of the plate 37 by suitable bolts and nuts 52 (see Figs. 2 and 3) so as to locate the drive shaft 53 of the motor 35 in position for contact by the turntable drive pulley 40 (see Figs. 5 and 6). The drive shaft 53 is formed with an enlargement 54 at its upper end, preferably by pressing thereon a short section of a wire spring of suitable diameter and gauge wire. This enlargement and the shaft directly below provide hubs of slightly differing diameters wherewith the turntable drive pulley 40 coacts to operate the turntable B at two different speeds, as will be presently explained.

*The turntable*

The turntable B is in the form of a flanged casting mounting on its under side a cam disc 55 (see Figs. 4, 12, 13, 15, 16 and 17). The cam forms a part of the tone arm retracting and record-release actuating mechanism F to be presently described. In the hub of the disc is fixed a bushing 56 whereby the turntable is journaled on the spindle 33 (see Figs. 12 and 13). A suitable covering of friction material, such as flock, is spread over the top and flange of the turntable B so as to ensure the holding of a record in rotative contact therewith.

The tone arm

Figure 1:
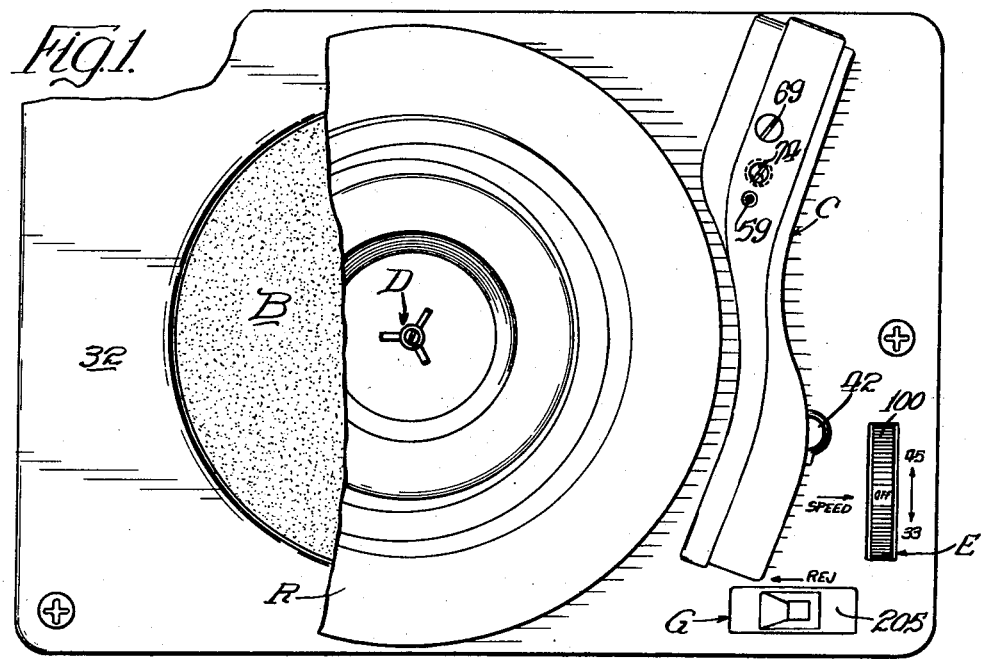
Figure 1 is a plan view of an improved speed-altering, record-changing phonograph embodying this invention, the tone-reproducing arm being in the rest position, and a part of the record being broken away so as to show the record-supporting turntable.

The tone arm C is in the form of a light metal casting somewhat S-shaped (see Fig. 1) at the forward end of which is mounted a suitable recording stylus (see Fig. 3). At its rear end is hinged a mounting hub 57 and a counterweight 58. A pin 59 attached to the tone arm C forwardly of the hub 57 coacts with the tone arm return and record-release mechanism F to secure a return to starting position and also a reset of the tone arm C, as will be subsequently explained.

The mounting hub 57 is keyed to a pin 60 which is journaled on a fork 61 attached to a bracket 62 secured to the inner rear end of the tone arm C. To the bracket 62 is hinged at 63 an arm 64 on the outer end of which is secured the counterweight 58. A set screw 65 on the hub 57 permits it to be removably keyed to the post 34 so as to turn therewith.

The counterweight 58 is preferably formed of a heavy metal such as lead. It is secured to the outer end of the arm 64 by a screw 68. The purpose of this counterweight is to counterbalance the weight of the tone arm C, forwardly of the pivot pin 64, and so lessen the pressure of the recording stylus on the record.

The pin 59 is threaded onto the bracket 62 forwardly of the pivot 63 of the arm 64. It is adapted to be engaged by the tone arm retracting and record-release mechanism F, as will be indicated presently. The pin 60 is preferably supported on the fork 61 by cone bearings, as most clearly shown in Fig. 8. The fork 61 is attached to the bracket 62, preferably by a rivet 66, and adjacent the pin 60 the fork 61 is spanned by a screw 67 which serves to adjust the spacing of the arms of the fork so as to secure the desired tension on the cone bearings of the pin 60.

The bracket 62 is rigidly secured to the tone arm C by a set screw 69 so that the bracket and tone arm are a unit. At its rear end the bracket 62 has a T-shaped extension 70 the stem part of which extends through and locates the transverse part under the legs 71 of the U-shaped terminus of the arm 64 (see Figs. 7, 8, and 9). Thus, for all times when the pin 59 is not contacted by the tone arm retracting and record-release actuating mechanism F, the forward end of the tone arm C, as it swings down toward the record, elevates the transverse part of the T-extension 70 and brings it into contact with the legs 71 of the U-shaped extension of the arm 64 and thereby makes the counterweight 58 an effective counterbalance to the weight of the tone arm C forwardly of the pivotal pin 60.

Between the arm 64 and the counterweight 58 is inserted a plate 72 which has a finger or detent 73 positioned to engage the hub 57 (see Figs. 7 and 9) when the pin 59 is contacted by the tone arm retracting and record-release actuating mechanism F, thereby to render the counterweight 58 inactive. This permits the full weight of the tone arm C forwardly of the pivot pin 60 to be effective to hold the pin 59 in operative relationship with the tone arm retracting and record-release actuating mechanism F. When the tone arm C is in reproducing position and consequently out of contact with the tone arm retracting and record-release actuating mechanism F the finger 73 is retracted from contact with the hub 57 (see Fig. 3). An eccentric screw 74 permits an adjustment of the tone arm to insure the stylus sitting down in the pick-up groove at the outer edge of the record.

This tone arm is claimed in my copending application No. 138,474, filed January 13, 1950.

The record support and release means

The record support and release means D which is best shown in Figs. 25-28 comprises the spindle 33 mounting a plurality of record supporting arms or fingers 75 and a record retaining expansion ring 76. The fingers 75 and ring 76 are actuated into their opposite positions for respectively releasing coaction of a fulcrum element 77 and a cam pin 78 with a cam ring 79 and a compression head 80 in response to the shifting of a control rod 81 connected to the tone arm return and record-release actuating mechanism F.

The spindle 33 herein shown, in order to provide a mounting for the fingers 75, is formed with three axially disposed slots 82 which extend inwardly from the upper end of the spindle for the greater part of the length thereof. The spindle being formed of metal having a degree of resiliency, the portions thereof between the slots 82 are sufficiently compressible to permit the cam ring 79 to be slid down over the spindle into an annular seat formed therein and also permit a binding ring 83 with its tapered flange 84 to embrace and be retained on the end of the spindle.

The fingers 75 are formed with lugs 85 and recessed cam surfaces 86 on the opposite faces of their inner ends, respectively, for coaction with the fulcrum element 77, the cam pin 78, and the cam ring 79 to effect the desired disposition of the fingers in either their extended or retracted positions, as shown in Figs. 25, 26, and 27. Below the lug 85 and the cam surface 86 each of the fingers 75 has the opposite surfaces inclined toward each other so as to form a tapered end. This permits the fingers 75 to be rocked outwardly when the fulcrum element 77 is urged upwardly against the lugs 85, and likewise keeps the outer surface of the finger ends within the periphery of the spindle 33 when the fingers are retracted. At their upper ends the fingers 75 are bent slightly inwardly so as to insure having the extremities thereof well within the periphery of the spindle 33 when a record R is to be released to slide down the spindle onto the turntable B.

The expansion ring 76 is made of displaceable material, such as rubber or its synthetic equivalent. This ring is interposed between the end of the spindle 33 and the compression head 80, and being displaceable will expand outwardly to grip the inner periphery of the center hole h of the record R and retain it and the records above it on the spindle during the time that the fingers 75 are retracted to permit a release of the lowermost record R.

The element 77 is formed adjacent its top with a circumferentially extending outwardly protruding rib 77.1 for engaging with the fingers immediately below the lugs 85. This rib is relatively sharp so as to minimize the friction which attends rocking movement of the fingers upon this rib as a fulcrum. The fulcrum element 77 which is slidably supported within the spindle is normally urged upwardly by a spring 87 so that its upper end is pressed against the under surfaces of the lugs 85. The fingers 75 are thereby shifted upwardly to the extent permitted by engagement of the lower end of the cam surface 86 against the cam ring 79, and then forced outwardly as shown in Figs. 25 and 26, to support thereabove a stack of records R.

The cam pin 78 which is attached to the rod 81 is held in retracted position by a spring 88 housed in the cam head 80 and interposed between a shoulder 89 and a nut 90, the latter being threaded on the upper end of the cam pin 78 for axial movement within the bore 91 in the head 80. At its lower end the cam pin 78 is reduced slightly so that when pulled down against the action of the spring 88 the end of the pin may engage the upper edges of the lugs 85 and shift the fingers 75 lengthwise of the spindle 33, to the extent permitted by engagement of the cam ring 79 with the upper end of the cam surfaces 86 (see Fig. 27), and against the spring-biased fulcrum 77, thereby rocking the fingers inwardly to their retracted positions.

The head 80 is formed with a depending tubular stem 92 whereby the head is supported in the upper end of the spindle 33 concentrically therewith to permit a slight axial movement to cause a shoulder 93 to compress the ring 76 between itself and the spindle and expand outwardly into contact with the surrounding record R.

The rod 81 is secured at its upper end to the inner end of the cam pin 78 and extends down through the fulcrum 77 and the spindle-supporting nipple 43 to a point below the base 31 (see Figs. 12 and 13). On its lower end is mounted a pair of collars 94 and 95. The collar 94 is secured directly to the rod 81 by a set screw 96, and the collar 95 which is threaded on to the collar 94 is secured in place by a set screw 97. The adjustment of these collars 94 and 95 relative to each other and to the rod 81 permits and insures the correct action of the rod 81 to release a record by the tone arm retracting and record-release actuating mechanism F, which will be described presently in detail.

The speed-changing and switch-actuating mechanism

The speed-changing and switch-actuating mechanism E comprises the turntable drive pulley 40, a current switch 98, and a crank-shaft 99 mounting a dial 100, whereby the energizing or de-energizing of the motor 35 is synchronized with the shifting of the pulley 40 into and out of engagement with the motor drive shaft 53 or its hub enlargement 54.

The turntable drive pulley 40 comprises a pair of flanged discs 101 between which is clamped a friction ring 102 secured to a hub 103 on the upper end of which is a second friction ring 104. The pulley 40 is journaled on a bracket 105 hinged by a pin 106 on a lever 107 swingably and slidably supported on a post or pin 108 that is rigid on the plate 37 (see Figs. 19, 20, and 21). This mounting permits the pulley 40 to be swung horizontally and shift vertically to engage the friction ring 104 with the inner face of the flange on the turntable B, and at the same time engage the friction ring 102 with the motor shaft 53 or its hub enlargement 54, and thereby provide for a two-speed operation of the turntable B.

A spring 109 connected to the plate 37 and to an ear 110 (see Figs. 6, 19, 20, and 21) on the lever 107, and a spring 111 connected to an ear 112 on the lever 107 and an ear 113 (see Figs. 6 and 18) on the bracket 105, coact to swing and hold the drive pulley 40 in contact with the motor shaft 53 or its hub enlargement 54 or with an "off" position post 114 on the base 31, depending upon whether the crank-shaft 99 is in one of its extreme angular positions or in its intermediate "off" position, as will be explained more fully hereinafter.

The motor switch 98 is of a conventional construction having a switch lever 115 (see Figs. 2, 5, and 6) forked to engage one of the pair of lugs 116 on a slide 117 (see Figs. 10 and 11) mounted on the base 31 so as to be actuated by the crank-shaft 99. As will be noted from Figs. 6, 10, and 11, the slide 117 is supported on the base 31 by the T-shaped lugs 116 operating in a slot 118 formed on the base 31. Intermediate the lugs 116 the slide 117 is formed with an arcuate slot 119 which coacts with the crank-shaft 99 to effect a reciprocation of the slide 117 on the base 31 for shifting the switch lever 115 to open and close the switch 98.

The crank-shaft 99 is journaled at one end on a plate 120 and at the other end on a bracket 121. It is formed with cranks 122 and 123 which produce a simultaneous shifting of the drive pulley lever 107 and the switch slide 117 so that closing and opening of the switch 98 is synchronized with shifting of the drive pulley 40 into and out of driving contact with the motor shaft 53 or its enlargement 54. These cranks are, in effect, cams and are so referred to at times hereinafter.

The plate 120 is secured to the base 31 by suitable screws 124 and spaced walls upstanding therefrom provide a journal support for a sleeve 125 which is keyed to the end of the crank-shaft 99. The bracket 121 which is secured to the under side of the motor plate 37 (see Figs. 5 and 6) extends upwardly through an opening 126 in the base 31 to support thereabove a rubber or plastic bearing 127 for the crank-shaft 99.

The cranks 122 and 123 are angular offsets in the shaft 99. The former extends through a slot 128 (see Figs. 19, 20, and 21) in an arm 129 on the drive pulley mounting-lever 107. The latter extends through the slot 119 in the slide 117 (see Figs. 5, 6, and 10). Obviously, the radius of the respective cranks 122 and 123 is sufficient to secure the desired swinging and axial shifting of the lever 107, in one case, and the desired reciprocal movement of the slide 117, in the other case, as a result of a 180-degree turning of the shaft by the dial 100.

This dial which may be of any suitable material is keyed to the end of the crank-shaft 99 adjacent the bearing plate 120. Its periphery is knurled and is provided with the three 90-degree spaced markings, "off," "33," and "45," to correspond with the three positions of the crank-shaft 99 for rendering the turntable either inoperative or operative at a speed of either 33 R. P. M. or 45 R. P. M., depending upon the type of the record to be reproduced. The dial 100 is yieldingly retained in any one of these three positions through the action of a leaf spring 130 coacting with shoulders 131 on the hub of the dial 100, and a finger 132 coacting with prongs 133 on the adjacent flange of the channel plate 120 (see Fig. 24).

The leaf spring 130 has its ends upturned and seated in notches 134 in a horizontal extension 135 of the adjacent flange on the channel plate 120. The intermediate part of the spring 130 bears against two adjacent lugs 131 on the hub of the dial 100 (see also Figs. 5 and 6) to yieldingly retain the dial 100 in any one of its three positions. The engagement of the finger 132 with the prongs 133 limits the rotation of the dial to 180 degrees.

This speed changing mechanism is claimed in my copending application No. 138,471, filed January 13, 1950.

The tone arm return and record-release actuating mechanism

The tone arm return and record-release actuating mechanism F comprises the cam disc 55 on the underside of the turntable B, a tone arm retracting plate 136, and a record-release shifting means 137. These are respectively actuated by two of the cam tracks formed in the cam disc 55, as will be presently explained, and wherewith they are brought into engagement by the coaction of a tripper 138 under the influence of the feeler 50 controlled by swinging movement of the tone arm C.

The cam disc 55, in this particular embodiment, is formed with the hub cam tracks 140 and 141 and a ring cam track 142, respectively (see Figs. 4, 12, 13, 15, 16, and 17), constructed to effect (a) a horizontal movement, (b) a vertical movement, and (c) a combination vertical and horizontal movement. The coaction of these parts with the tripper 138, the record-release shifting means 137, and the plate 136, accomplish two co-ordinated results: namely, the return of the tone arm C to starting position, after it has completed the reproducing of a record, and the release of a record for subsequent reproduction.

The cam track 140 (see Figs. 4, 15 and 16) which is formed on the periphery of the hub of the cam disc 55 includes a quadrant extension 143 providing shoulders 144 and 145 of which the former constitutes the high point. During each revolution of the turn table B this quadrant extension 143 serves to slightly push back and immobilize the tripper 138 until it is so activated by the feeler 50, or the manually operable record-release actuating means G, as to postively swing its outer end into the path of the shoulder 145, whereupon the tripper 138 initiates the swing of the tone arm retracting plate 136 and the record-release shifting means 137, as will be explained subsequently.

The cam track 141 is formed on the end of the hub of the cam disc 55. It is provided with a gradual incline circumferentially of the hub from a low point 146 to a high point 147 and with a sudden descent from its high point to its low point (see Fig. 4). This cam surface is also inclined radially inwardly and upwardly (see Figs. 12 and 13) for a purpose presently to be explained. Coacting with the record-release shifting means 137, this cam track 141 effects a depression of the rod 81 for actuating the record support and release means D whose construction has already been explained.

The cam track 142 is formed by the junction of opposite spirals extending inwardly and gradually inclined axially upwardly from peripheral openings 148 and 149 and crossing each other at different levels substantially opposite the openings 148 and 149, so as to constitute inner and outer portions 142.1 and 142.2, which over-pass and under-pass each other at 150 (see Figs. 4, 15, and 16).

A section 151 of the cam disc 55, at the point 150 of the over- and under-passing of the cam track portions 142.1 and 142.2, is hinged at 152 so that it may be retracted to permit a cam follower on the tone arm retracting plate 136 (after traversing the inner portion 142.2) to retract said section 151 and follow the under-pass approach to the outer track portion 142.1. A leaf spring 153 which is anchored at 154 normally shifts the section 151 to align its inner end with the inner track portion 142.2.

The tone arm actuating plate 136 is substantially a bell crank lever, somewhat broadened at its middle part 155. At the opposite sides of this broadened part are formed embossments 156 which coact with a pivot pin 157 to so support the plate 136 as to permit its swinging in a horizontal plane about the vertical axis of the pivot pin 157, and its tilting in a vertical plane about a shifting horizontal axis which extends through the points of contact of the embossments 156 on the base 31 and a contiguous groove 163.1 disposed radially of the plate pivot. A lug 158 on the arm 136 also contacts the base 31 and coacts with the embossments 156 to provide for this combination shifting and tilting movement of the plate 136 on the base 31.

The pin 157 extends through an aperture in the plate 136 slightly larger than the diameter of the pin 157 so as to permit the tilting action and the swinging movement just described. A spring 159 interposed between the plate 136 and a washer 160 on the pin 157 normally holds the plate 136 with the embossments 156 and the lug 158 in contact with the base 31, and yieldingly resists the vertical tilting of the plate 136.

Secured at one end of the plate 136 is a cam track follower pin 161 and at the opposite end of this plate is formed an integral arcuate shaped extending arm 162 formed intermediately of its ends with a transverse ledge 163. This arcuate arm 162 is adapted to engage the pin 59 to elevate the tone arm C and return it to its starting position, as a result of the cam follower pin 161 being brought into engagement with the cam track 142, as will be explained more fully hereinafter.

A spring 164 (see Figs. 3, 5, and 6) urges the plate 136 toward its normal or retracted position (see Figs. 5 and 15), as limited by stops 165 and 165.1. The spring 164 has one end attached to a lug 166 struck out from the plate 136 and extending down through a slot in the base 31 (see dotted outline of slot in Fig. 6). The other end of the spring 164 is connected to an ear 167 on the end of one of a pair of lugs 168 struck out from the base 31, forming a support for the record-release shifting means 137, presently to be described.

The stop 165 is in the form of a finger struck down from the edge of the plate 136 and extending through an opening 169 (formed by the striking out of the adjacent lug 168 from the base 31) and abuts a shoulder 170 (see Figs. 5 and 6) jutting into said opening 169. The stop 165.1 is an angle piece having one leg secured to the base 31 so that its upright leg is contacted by the edge of the plate 136 practically simultaneously with the contact of the finger 165 against the shoulder 170.

The record-release shifting means 137 comprises a rocker arm 171, a detent 172, and a detent-tipping and trigger-restoring finger 173. The rocker arm 171 is pivoted at 174 between the pairs of lugs 168 and rests upon a spring 175 (see Fig. 14) which is supported on the collar 95. Normally the arm 171 is held by the tension of the spring 88 (see Fig. 25) with the angularly disposed end 176 abutting the bottom of the base 31.

The detent 172 is pivoted at 177 to the arm 171 with the outer end of the arm 171 extending through a slot 178 in the detent 172 (see Figs. 12 and 13). At its upper end the detent 172 mounts a roller 179. The periphery of the roller is tapered to conform to the inward and upward inclination of the cam track 141. This insures the roller 179 remaining in contact with the cam track during the rotation of the turntable B for effecting the retraction of the fingers 75 and the consequent release of a record R. At its lower end the detent 172 is provided with an extension which serves as a counterweight 180 and tends normally to tilt the detent 172 back out of the path of the cam track 141 and against a shoulder 181 (see Fig. 5) formed on the base 31. The disposition of this shoulder 181 may optionally be altered so that it will arrest retraction of the detent 172 to locate the roller 179 at the desired distance away from the cam track 141.

The detent-tipping and trigger-restoring finger 173 is in the nature of a small bell crank lever pivoted at 182 on the under side of the plate 136 adjacent the cam follower pin 161 (see Figs. 5, 6, 15, and 16). The finger 173 is disposed by a spring 183 so that shoulders 184 and 184.1 respectively contact the detent 172 and the tripper 138. When the plate 136 initiates its inward swinging movement, the shoulder 184 shifts the detent 172 inwardly against the action of the counterweight 180 to engage the cam roller 179 with the cam track 141. As the plate 136 completes its inward swinging movement, the shoulder 184.1 contacts the tripper and restores it to its normal position. The spring 183 is fastened at one end to a lug 185 on the plate 136 and a lug 186 on the finger 173.

A lug 187 struck up from the finger 173 extends through an aperture 188 in the plate 136 and limits the swinging movement of the finger 173 on its pivot 182. A second lug 189, struck down from the tipping finger 173, moves in a slot 190 in the base 31. The lug 189 is so positioned as to pass over the ledge 191 incident to the plate 136 being swung on the pivot pin 157 to enter the cam follower pin 161 into the opening 148 of the cam track 142, and concurrently shift the detent 172 to engage the roller 179 with the cam track 141, whereupon the tipping finger 173 is shifted on its pivot 182 to disengage the shoulder 184 from contact with the detent 172 (see Fig. 6), the cam roller 179 meanwhile having been retentively engaged by the cam track 141.

The tripper 138 is in the nature of a bell crank lever pivoted at 192 on the base 31 and is formed with a V-shaped cam 193 at one end for contacting the cam track 140, and with a cam shoulder 194 at the other end for contacting a cam surface 195 on the tone arm retracting plate 136 (see Fig. 5). The tripper 138 also mounts a finger 196 which is adapted to coact with the feeler 50 to effect an initial shifting of the plate 136 a sufficient distance to engage the cam track follower 161 with the cam track 142.

The tripper 138 is normally positioned, as shown in Figs. 5, 15, and 22, with the cam surface 195 against the cam shoulder 194, so long as the plate 136 is in its normally retracted position, and with the face 193.1 of the cam 193 contactable by the outer periphery of the quadrant section 143 of the cam track 140. However, the pivot of the tripper 138 is such that the point of the cam 193 can traverse a radius inwardly of the depressed surface of the cam track 140 (see Fig. 23). Thus, if at any time, when it is not contacted by the face of the quadrant 143, the tripper 138 is shifted to locate the tip of the cam 193 in the path of the shoulder 145, said tripper will be swung on its axis and cause a swinging of the plate 136 for the purpose above mentioned.

The feeler 50 is in the form of an angularly shaped, light metal arm swingably supported on the tone arm post 34. Its function is to swing the tripper 138 so as to move the cam 193 into the path of the cam shoulder 145 when said cam is not immobilized by reason of its contact with the cam quadrant 143. The feeler 50 is positioned between the bushing 44 and the friction pad 51 resting on the collar 46. Thus, as the tone arm C swings back and forth, it causes a rotation of the friction pad 51 and, by reason of the weight of the bushing 47, causes the finger 50 to move with the tone arm. However, if in its swinging movement the feeler 50 strikes an obstruction which cannot yield to the friction contact of the feeler with the tone arm C as, for example, the tripper 138 when held inactive by the cam quadrant 43, the continued movement of the tone arm C will cease to affect the movement of the feeler 50. The feeler 50 is of such a length that its outer end is in the path of the finger 196 when the tone arm C moves toward the inner limit of its swing in response to tracking of its stylus in a record R. Shoulders 197 are formed on the base of the feeler 50 and spaced apart circumferentially so that their contact with the edges of the bracket 45 limit the opposite swinging of the feeler 50.

This tone arm control mechanism is claimed in my copending application No. 138,473, filed January 13, 1950.

*The manually operable record-release actuating means*

The manually operable record-release actuating means G (most clearly shown in Figs. 22 and 23) comprises a right angle bell crank lever 198 mounting on one of its arms a locking pawl 199 and coacting therewith to permit the tripper 138 to be actuated to effect a release of a record R at any time. If the tripper 138 is not immobilized, the release of a record will be immediate with a shifting of the lever 198. If, however, the tripper 138 is immobilized, the bell crank lever 198 will be retained in tripper-actuating position by the pawl 199 until the tripper 138 has been freed, whereupon the lever 198 will be instantly actuated to effect a release of a record.

The bell crank lever 198 is pivoted at 200 to the under side of the base 31 so as to dispose a finger 201 in position to actuate the tripper 138. The opposite or outer end extends out through an opening 202 formed in the corner of the base 31 and its flange 36 adjacent the bearing plate 120.

The locking pawl 199 is a right angle strip with one leg slotted, as at 203, to permit its sliding pivotal connection to a pin 204 on the upper face of said other arm of the bell crank lever 198. The other leg of the pawl is disposed vertically above the base 31 and mounts a button 205 (see Fig. 3). Adjacent its angle the locking pawl 199 is formed with a shoulder 206 which is adapted to engage a shoulder 207 on the base 31 when an attempt is made to shift the lever 198 for the purpose of actuating the tripper 138 when it is immobilized by its contact with the cam quadrant 143 of the cam track 140.

The finger 201 is preferably a wire secured to the end of the inner arm of the bell crank lever 198. The free end 208 of the wire is angularly disposed so as to extend up through an aperture 209 in the base 31 in position to contact the tripper 138 (see Figs. 22 and 23).

A spring 210, hooked through an aperture 211 in the lever 198 and a lug 212 on the base 31, normally urges the bell crank lever 198 toward its retracted or neutral position. The action of the spring is limited by engagement of the pin 208 against the near edge of the aperture 209 (see Figs. 5 and 22). A spring 213, connected to lugs 214 and 215 on the lever 198 and pawl 199, respectively, normally urges the pawl into alignment with the bell crank lever 198 with the forward or outer end of the slot 203 in the pawl 199 bearing against the lever pin 204, as shown in Figs. 5, 6, and 23. This spring serves to hold the pawl shoulder 206 in engagement with the shoulder 207, as shown in Fig. 22, when the tripper 138 is immobilized by reason of its contact with the cam quadrant 143 and the lever 198 is shifted for the purpose of releasing a record.

Operation

The operation of this improved phonograph and its various mechanisms is as follows:

Let it be assumed that a stack of records R has been placed on the spindle 33 to be supported on the arms 75 (see Fig. 25), and that the dial 100 is on the "off" position, as shown in Fig. 5. In this position the switch 98 is open so that there is no current flowing to the motor, and the lever 107 is consequently in an intermediate position which locates the pulley 40 in contact with the "off" post 114 (see Fig. 5).

Since none of the mechanisms will operate until the turntable B is rotating, the first step will be to turn the dial 100 from the "off" position to either the "33" or "45" position. Such a turning of the dial will cause the cams 122 and 123 to simultaneously swing and shift the lever 107 (see Figs. 18–20) and the slide 117 (see Figs. 5, 6 and 10). The horizontal swinging of the lever 107 on the pin 108 and its simultaneous vertical shifting thereon moves the pulley 40 to bring the friction ring 102 into contact with either the motor post 53 or its enlarged hub part 54 and the friction ring 104 into contact with the inner face of the turntable flange. Whether the pulley 40 engages the motor post 53 or hub 54 depends upon whether the shift of the dial 100 is to the left or the right, as viewed from Fig. 3. The shift of the dial 100 to the left would result in the turntable B operated at 33 R. P. M.; the shift to the right would result in its operating at 45 R. P. M.

The simultaneous shifting of the slide 117 by action of the crank 123 would close the switch 98 and thus energize the motor 35, the dial 100 having been shifted to secure the operation of the turntable B at either of the aforesaid speeds.

In order to position a record on the turntable B for sound reproduction, the button 205 is shifted to the left, as viewed from Figs. 5, 6, 22, and 23. This actuates the lever 198 so as to swing the pin 208 into contact with the tripper 138. If, perchance, at the instant of such shifting of the lever 198, the cam surface 193.1 of the cam 193 of the tripper 138 should be in contact with the cam quadrant 143 (see Fig. 22), the tripper 138 would be immobilized. In such circumstances the lever 198 would not move on its pivot 200. However, the pawl 199 would swing and shift on the pin 204 so as to bring the shoulder 206 into engagement with the shoulder 207, and in this position the parts would be held by the spring 211 during the period of temporary immobilization of the tripper 138 (see Fig. 22).

As soon as the turntable B moves the shoulder 144 beyond the point of the cam 193 of the tripper 138, the tripper 138 is swung on its pivot 192 into the position shown in Fig. 23. Thereupon the continued rotation of the turntable B causes the cam shoulder 145 to further shift the tripper 138 sufficiently to cause the cam shoulder 194, bearing against the cam shoulder 195 on the plate 136, to swing the plate 136 horizontally on the pin 157 so as to move the cam track follower 161 into position to be engaged by the cam track 142 through the opening 148 (see Fig. 16). This initial swinging of the plate 136 moves the finger 173 to contact the shoulder 184 with the detent 172 (see Fig. 5). Thereupon the detent 172 is caused to tilt on its axis 177 to bring the cam roller 179 into retained engagement with the cam track 141 (see Fig. 13). As a consequence, continued rotation of the turntable B depresses the lever 171 against the action of the spring 175 and exerts a downward pull on the rod 81 against the action of the spring 88 (see Figs. 25, 26, and 27). As an incident to this operation, when the cam track follower 161 is picked up by the cam track 142, a further movement of the plate 136 disengages the shoulder 184 of the finger 173 from contact with the detent 172, as most clearly appears in Figs. 5 and 6.

Downward pull on the rod 81 produces a compression of the ring 76 with a consequent peripheral expansion which causes it to engage the next-to-the-lowermost record R (see Figs. 26 and 27), and retain it, together with the records stacked thereon, against displacement during release of the lowermost record. This movement of the rod 81 moves the cam pin 78 into contact with the lugs 85 on the arms 75. The arms 75 are, thereupon, simultaneously rocked inwardly on the fulcrum 77 as it is depressed against the action of the spring 87. This slight downward movement of the arms 75 causes the cam ring 79, acting on the cam surfaces 86, to facilitate the inward swinging of the upper ends of the arms 75 into the position shown in Fig. 27. Thereupon the lowermost record R is released for gravity descent onto the turntable B.

As the turntable B completes one revolution, following engagement of the cam roller 179 with the cam track 141, the roller 179 is released and the spring 88 actuates the rod 81 to elevate the lever 171, and the counterweight 180 simultaneously swings the detent 172 into the retracted position shown in Fig. 12. With release of the rod 81, the spring 88 retracts the cam pin 78 and permits the spring 87 to restore the fulcrum 77 to its normal position. Such restoration brings the upper end of the fulcrum 77 into contact with the lugs 85 on the fingers 75. The fingers are thereupon urged upwardly on the spindle to the limit permitted by the cam ring 79. The combined upward thrust of the fulcrum 77 on the finger lugs 85 and the action of the cam ring 79 on the finger cam surfaces 86 causes the fingers 75 to swing outwardly to a position of support for the stack of records R. This stack is released to the fingers 75 by the concurrent retraction of the head 89 which permits the ring 76 to relax from its contact with the record continuously engaged during retraction of the fingers 75. If the record which is released by this operation of the mechanism C has to be rotated at a speed other than that for which the turntable B has been set by the dial 100, it is only necessary to shift the dial 100 through an angle of 180 degrees to change the contact of the pulley 40 with the motor shaft 53.

In a manner that will be explained later, the plate 136, during its inward and return swinging movement to effect release of a record, will lift the tone arm C from its rest 42 and set it in position for the stylus to engage the pick-up groove on the outer edge of the record. As the tone arm swings into playing position in response to tracking of the stylus on the record, the transverse part of the T-shaped extension 70 of the bracket 62 is moved into contact with the legs 71 of the U-shaped terminus of the arm 64 (see Fig. 3). Thereupon the counterweight 58 becomes effective to counterbalance the weight of the forward end of the tone arm C so as to lighten the pressure of the stylus on the record.

As the tone arm stylus completes its traverse of the recording grooves and follows the rapidly-decreasing spiral inwardly of the recording grooves, the feeler 50 which has been swinging concurrently with the tone arm C comes into contact with the finger 196 on the tripper 138. If the surface 193.1 of the cam 193 of the tripper 138 is in contact with the cam quadrant 143, as shown in Figs. 15 and 22, the feeler 50 momentarily will be ineffective to swing the tripper 138 on its pivot 192. However, by reason of the frictional engagement of the feeler 50 with the tone arm collar 46, the tone arm C will continue its inward swing, thus holding the feeler 50 in contact with the finger 196 until the tripper 138 has been released from the cam quadrant 143. Thereupon the subsequent engagement of the tripper cam 193 by the shoulder 145 will cause the tripper 138 to initiate a swinging of the plate 136 as hereinbefore explained in connection with actuation of the mechanism G. If, on the other hand, the feeler 50 contacts the finger 196 of the tripper 138 when it is not immobilized by the cam quadrant 143, the tripper 138 will be immediately swung on its pivot 192 to bring the cam end 193 into the path of the shoulder 145. Thereupon the tripper 138 will be actuated to initiate a swinging of the plate 136, as hereinbefore explained, to enter the cam track follower 161 into the opening 148 to the cam track 142.

As the turntable B continues its rotation, the cam track follower 161 on the lever 136 follows the path indicated by the arrows in Fig. 4 which is an under side view of the turntable cam 55. From this figure it will be noted that the cam track follower 161, after about a half revolution of the turntable B, begins to move spirally inwardly to the inner portion 142.2 of the cam track 142. As the follower 161 completes its inward travel the shoulder 184.1 on the lever 173 contacts the tripper 138 and restores it to its normal position preparatory to its subsequent activation to again initiate a shifting of the plate 136 to engage the follower 161 with the cam track 142. After the cam track follower 161 has completed approximately a full revolution of the turntable cam 55, the follower 161 begins to move spirally outwardly into the outer portion 142.1 of the cam track 142 toward the discharge opening 149.

During this traversing of the cam track 142 the cam track follower 161 is also being gradually depressed. At the high point of its depression the cam track follower 161 is traversing that portion of the cam track 142 formed in the shiftable section 151. As the cam track follower 161 approaches the end of its travel in the inner portion 142.2 of the cam track 142, the follower 161 retracts the cam track section 151 so as to permit the cam track follower 161 to move through the underpass and out into the outer portion 142.1 leading to the exit 149.

The depression of the cam track follower 161 by the high point of the cam track 142 causes a rocking of the plate 136 on the embossments 156 and elevates the extension 162 so as to contact the pin 59 of the tone arm C. As a result, the tone arm is tilted to move the stylus out of contact with the record. As the cam track follower 161 moves through the second half of the inner cam track portion 142.2, and approaches the section 151, the plate 136 is swung in a horizontal plane on the pin 157. This results in bringing the ledge 163 on the extension 162 in contact with the pin 59 on the tone arm C. As this extension is moved outwardly, the pin 59 is moved into contact with the ledge 163 and becomes seated in the groove 163.1. As a consequence the tone arm is shifted outwardly toward its starting position, and with the return inward movement of the extension 162 the tone arm is swung into a position for lowering the stylus into contact with the pickup groove in the record when the extension is retracted from its contact with the pin 59. The elevation of the tone arm C, incident to its being returned to starting position, swings the rear end of the tone arm downwardly and brings the finger 73 into contact with the hub 57 (see Figs. 7 and 9). The transverse part of the T-shaped extension 70 of the bracket 62 is thereupon freed of contact with the legs 71 of the U-shaped terminus of the arm 64. The weight 58 is consequently rendered inactive as a counterbalance for the tone arm C, with the result that the full weight of the tone arm, forwardly of the hinge pin 60, holds the pin 59 in firm contact with the plate extension 162.

As already explained, the initial inward movement of the plate 136 causes the finger 173 to shift the detent 172 to move the cam roller 179 into contact with the cam track 141. Hence, during the travel of the cam track follower 161 around the first revolution of the cam track 142, the cam track 141 is effective for release of a record R from the record support and release mechanism D.

As the cam track follower 161 travels from the inner portion 142.2 of the cam track 142 to the outer portion 142.1, it not only swings the plate 136 to move the tone arm C inwardly toward the record, but by reason of the receding character of the cam track 142 it permits the spring 159 (see Fig. 17) to exert a pressure to restore the plate 136 to its normal position with the lug 158 in contact with the base 31. As the cam track follower 161 approaches the exit opening 149 of the cam track 142, the tone arm C is poised in starting position over the record that has been released for positioning on the turntable as the plate 136 initiated the elevation and retraction of the tone arm C. As the cam track follower 161 is released from the cam disc 55, the spring 159 consummates the restoration of the plate 136 to its normal position and frees the pin 59 from the plate extension 162 so that the tone arm stylus will engage the record. This release of the pin 59 from the plate extension 162 results in a restoration of the contact of the transverse part of the T-extension 70 of the bracket 62 with the legs 71 of the U-shaped terminus of the arm 64. Thereupon the counterweight 58 is effective as a counterbalance to the weight of the tone arm C forwardly of its support on the post 34, with the resultant light contact of the stylus with the record.

If any record released to the turntable is one the playing of which is not desired, another record can be instantly released by a simple actuation of the button 205 of the means G as hereinbefore explained.

The subject matter herein claimed was first disclosed in my application filed December 15, 1949, Serial No. 133,168, now abandoned, of which this case is a division.

I claim:

1. In a phonograph, the combination of a supporting base, a record-supporting turntable journaled for rotation on the base, a motor connectable to rotate the turntable, a record-supporting spindle associated with the turntable, means for releasing records one at a time for positioning on the turntable, a tone arm oscillatingly mounted on the base to traverse a record on the turntable, a cam member associated with the turntable and having separate cam tracks for respectively effecting vertical and horizontal movements, means on the base for returning the tone arm to its starting position after completing the playing of a record, a pair of cam followers shiftably mounted on the base and respectively connected to the record release means and the tone arm returning means and concurrently actuatable to engage the respective cam tracks to effect the coordinated action of the two means for returning the tone arm to its starting position and releasing a record on the spindle, tripper means mounted on the base and adapted to initiate engagement of the cam followers with the respective cam tracks, and a lever swingably mounted on the base and adapted to be shifted to manually actuate said tripper means.

2. In a phonograph, the combination of a supporting base, a record-supporting turntable journaled for rotation on the base, a motor connectable to rotate the turntable, a record-supporting spindle associated with the turntable, means for releasing records one at a time for positioning on the turntable, a tone arm oscillatingly mounted on the base to traverse a record on the turntable, a cam member associated with the turntable and having separate cam tracks for respectively effecting vertical and horizontal movements, means on the base for returning the tone arm to its starting position after completing the playing of a record, a pair of cam followers shiftably mounted on the base and respectively connected to the record release means and the tone arm returning means and concurrently actuatable to engage the respective cam tracks to effect the coordinated action of the two means for returning the tone arm to its starting position and releasing a record on the spindle, tripper means mounted on the base and adapted to initiate engagement of the cam followers with the respective cam tracks, means associated with the turntable for immobilizing said tripper means during a portion of each revolution of the turntable, a lever swingably mounted on the base and adapted to be shifted to manually actuate said tripper means, and coacting means on the lever and the base adapted to hold the lever in its tripper means actuating position so long as said tripper means is immobilized by said turntable means.

3. In a phonograph, the combination of a supporting base, a record-supporting turntable journaled for rotation on the base, a motor connected to rotate the turntable, a record-supporting spindle associated with the turntable, means for releasing records one at a time for positioning on the turntable, a tone arm oscillatingly mounted on the base to traverse a record on the turntable, a cam member associated with the turntable and having separate cam tracks for respectively effecting vertical and horizontal movements, means on the base for returning the tone arm to its starting position after completing the playing of a record, a pair of cam followers shiftably mounted on the base and respectively connected to the record release means and the tone arm returning means and concurrently actuatable to engage the respective cam tracks to effect the coordinated action of said two means for returning the tone arm to its starting position and releasing a record on the spindle, tripper means mounted on the base and adapted to initiate engagement of the cam followers with the respective cam tracks, means associated with the turntable for immobilizing said tripper means during a portion of each revolution of the turntable, a lever swingably mounted on the base and adapted to be shifted to manually actuate the tripper means, a pawl pivotally mounted on the lever, coacting shoulders on the pawl and the base, and resilient means normally holding the pawl shoulder engaged with said base shoulder when the lever is shifted to actuate said record-release means during immobilization of said tripper means by said turntable means.

4. In a phonograph, the combination of a supporting base, a record-supporting turntable journaled for rotation on the base, a motor connectable to rotate the turntable, a record-supporting spindle associated with the turntable, means for releasing records one at a time for positioning on the turntable, a tone arm oscillatingly mounted on the base to traverse a record on the turntable, a plate mounted intermediately its ends on the base to swing in a horizontal plane on a vertical axis and tilt in a vertical plane on a horizontal axis, a rotating cam element actuated by the turntable and having three cam tracks the first of which effects horizontal movement, a second of which effects vertical movement, and a third of which effects both horizontal and vertical movements, a detent connected to the record release means and shiftable into and out of position to engage the second cam track to effect the successive release of records from the spindle, a cam track follower on the plate adapted to engage the third cam track to effect swinging and tilting movements of the plate, means on the outer end of the plate adapted to engage the tone arm to elevate the same and carry it to starting position when the plate is tilted and swung as a result of engagement of the follower with the cam track, tripper means swingably mounted on the base and actuated by the tone arm as it approaches the limit of its inward swinging to engage the first cam track and shift the plate to initiate contact of the plate cam track follower with the third cam track whereby the plate is actuated to return the tone arm to starting position, and a finger having a pair of shoulders formed thereon pivoted on the plate in position so that during the inward swinging and tilting movements of the plate one of the shoulders contacts the detent and shifts it into engagement with the second cam track and the other shoulder subsequently contacts the tripper and restores it to its initial position.

COLIN B. DALE.

No references cited.